(12) United States Patent
Bennett

(10) Patent No.: US 7,365,932 B1
(45) Date of Patent: Apr. 29, 2008

(54) DISK DRIVE COMPRISING AN OPTICAL SENSOR FOR VIBRATION MODE COMPENSATION

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/323,251

(22) Filed: Dec. 30, 2005

(51) Int. Cl.
*G11B 5/596* (2006.01)
*G11B 5/55* (2006.01)
*G11B 15/18* (2006.01)

(52) U.S. Cl. ............................ 360/77.03; 360/77.02; 360/78.04

(58) Field of Classification Search .................. None
See application file for complete search history.

(56) References Cited

U.S. PATENT DOCUMENTS

| | | | |
|---|---|---|---|
| 3,806,254 A | 4/1974 | Ha et al. | |
| 4,396,959 A | 8/1983 | Harrison et al. | |
| 4,516,177 A * | 5/1985 | Moon et al. | 360/77.07 |
| 4,967,291 A | 10/1990 | Touchton et al. | |
| 4,974,109 A * | 11/1990 | Hoshimi et al. | 360/77.11 |
| 5,227,930 A | 7/1993 | Thanos et al. | |
| 5,270,886 A | 12/1993 | Nigam | |
| 5,426,545 A | 6/1995 | Sidman et al. | |
| 5,442,172 A | 8/1995 | Chiang et al. | |
| 5,459,383 A | 10/1995 | Sidman et al. | |
| 5,471,304 A | 11/1995 | Wang | |
| 5,471,734 A | 12/1995 | Hatch et al. | |
| 5,563,868 A | 10/1996 | Farnsworth et al. | |
| 5,619,387 A | 4/1997 | Ottesen et al. | |
| 5,666,236 A | 9/1997 | Bracken et al. | |
| 5,831,786 A | 11/1998 | Boutaghou et al. | |
| 5,856,895 A | 1/1999 | Schaenzer et al. | |
| 6,052,250 A | 4/2000 | Golowka et al. | |
| 6,054,833 A | 4/2000 | Takeuchi | |
| 6,064,540 A | 5/2000 | Huang et al. | |
| 6,072,655 A | 6/2000 | Uwabo et al. | |
| 6,100,623 A | 8/2000 | Huang et al. | |
| 6,128,155 A | 10/2000 | Sugawara et al. | |

(Continued)

OTHER PUBLICATIONS

UDT Sensors Inc., "Non-contact optical position sensing using silicon photodetectors", App Note No. 13, Apr. 1982, http://www.udt.com.

(Continued)

*Primary Examiner*—William Korzuch
*Assistant Examiner*—Jason Olson
(74) *Attorney, Agent, or Firm*—Brian E. Jones, Esq.; Howard H. Sheerin, Esq.

(57) ABSTRACT

A disk drive is disclosed comprising an actuator arm, a head attached to a distal end of the actuator arm, a voice coil motor for rotating the actuator arm about a pivot, and an optical sensor operable to generate a first position signal representing a position of the actuator arm with respect to the disk, wherein the first position signal is substantially unaffected by a vibration mode of the actuator arm. Servo sectors recorded on the disk are processed to generate a second position signal representing a position of the head with respect to the disk, wherein the second position signal comprises a significant component due to the vibration mode of the actuator arm. A control signal is applied to the voice coil motor in response to the first and second position signals.

22 Claims, 13 Drawing Sheets

U.S. PATENT DOCUMENTS

| | | | |
|---|---|---|---|
| 6,157,522 | A | 12/2000 | Murphy et al. |
| 6,169,382 | B1 | 1/2001 | McKenzie et al. |
| 6,310,746 | B1 | 10/2001 | Hawwa et al. |
| 6,396,652 | B1 | 5/2002 | Kawachi et al. |
| 6,407,876 | B1 | 6/2002 | Yamaguchi et al. |
| 6,407,877 | B1 | 6/2002 | Mitani |
| 6,515,834 | B1 | 2/2003 | Murphy |
| 6,535,347 | B1 | 3/2003 | Wakuda |
| 6,542,326 | B1 | 4/2003 | Ell et al. |
| 6,563,660 | B1 | 5/2003 | Hirano et al. |
| 6,583,948 | B1 | 6/2003 | Taniguchi |
| 6,583,964 | B1 | 6/2003 | Huang et al. |
| 6,603,629 | B1 | 8/2003 | Tsai |
| 6,604,431 | B1 | 8/2003 | Soga et al. |
| 6,614,613 | B1 | 9/2003 | Huang et al. |
| 6,618,217 | B2 | 9/2003 | Heaton et al. |
| 6,618,218 | B1 | 9/2003 | Kadowaki et al. |
| 6,621,653 | B1 | 9/2003 | Schirle |
| 6,624,983 | B1 | 9/2003 | Berding |
| 6,631,047 | B2 | 10/2003 | Ishizuka et al. |
| 6,674,600 | B1 | 1/2004 | Codilian et al. |
| 6,690,551 | B2 | 2/2004 | Shiraishi et al. |
| 6,697,211 | B2 | 2/2004 | Koganezawa |
| 6,707,632 | B1 | 3/2004 | Raphael et al. |
| 6,747,834 | B1 | 6/2004 | Matsuyama |
| 6,791,784 | B2 | 9/2004 | Edwards |
| 6,798,609 | B1 | 9/2004 | Bonin et al. |
| 6,816,334 | B2 | 11/2004 | Watanabe et al. |
| 6,888,694 | B2 | 5/2005 | Guo et al. |
| 6,914,745 | B2 | 7/2005 | Takeuchi et al. |
| 6,924,958 | B2 | 8/2005 | Vigna et al. |
| 6,934,117 | B2 | 8/2005 | Huang et al. |
| 7,002,771 | B2 | 2/2006 | Christie, Jr. et al. |
| 7,215,504 | B1 | 5/2007 | Bennett |
| 2002/0054451 | A1 | 5/2002 | Moon et al. |
| 2002/0109931 | A1 | 8/2002 | Vigna et al. |
| 2003/0053244 | A1 | 3/2003 | Lewis |
| 2003/0133219 | A1 | 7/2003 | Ishizuka et al. |
| 2003/0147181 | A1 | 8/2003 | Shiraishi et al. |
| 2004/0001280 | A1 | 1/2004 | Ikedo et al. |
| 2004/0051993 | A1 | 3/2004 | Shin |
| 2004/0246833 | A1 | 12/2004 | Ehrlich |
| 2006/0119977 | A1 | 6/2006 | Zhu et al. |

OTHER PUBLICATIONS

M. Kobayashi et al., "Multi-Sensing Servo with Carriage-Acceleration Feedback for Magnetic Disk Drives", Proceedings of the American Control Conference, Jun. 1998, pp. 3038-3042.

F. Y. Huang et al., "Active Damping in HDD Actuator", IEEE Transactions on Magnetics, vol. 37, No. 2, Mar. 2001, pp. 847-849.

Office Action dated Jul. 20, 2007, from U.S. Appl. No. 11/336,316, 7 pages.

Office Action dated Sep. 21, 2006 from U.S. Appl. No. 11/253,400, 15 pages.

Notice of Allowance dated Jan. 24, 2007 from U.S. Appl. No. 11/253,400, 6 pages.

Office Action dated May 8, 2007 from U.S. Appl. No. 11/336,316, 15 pages.

\* cited by examiner

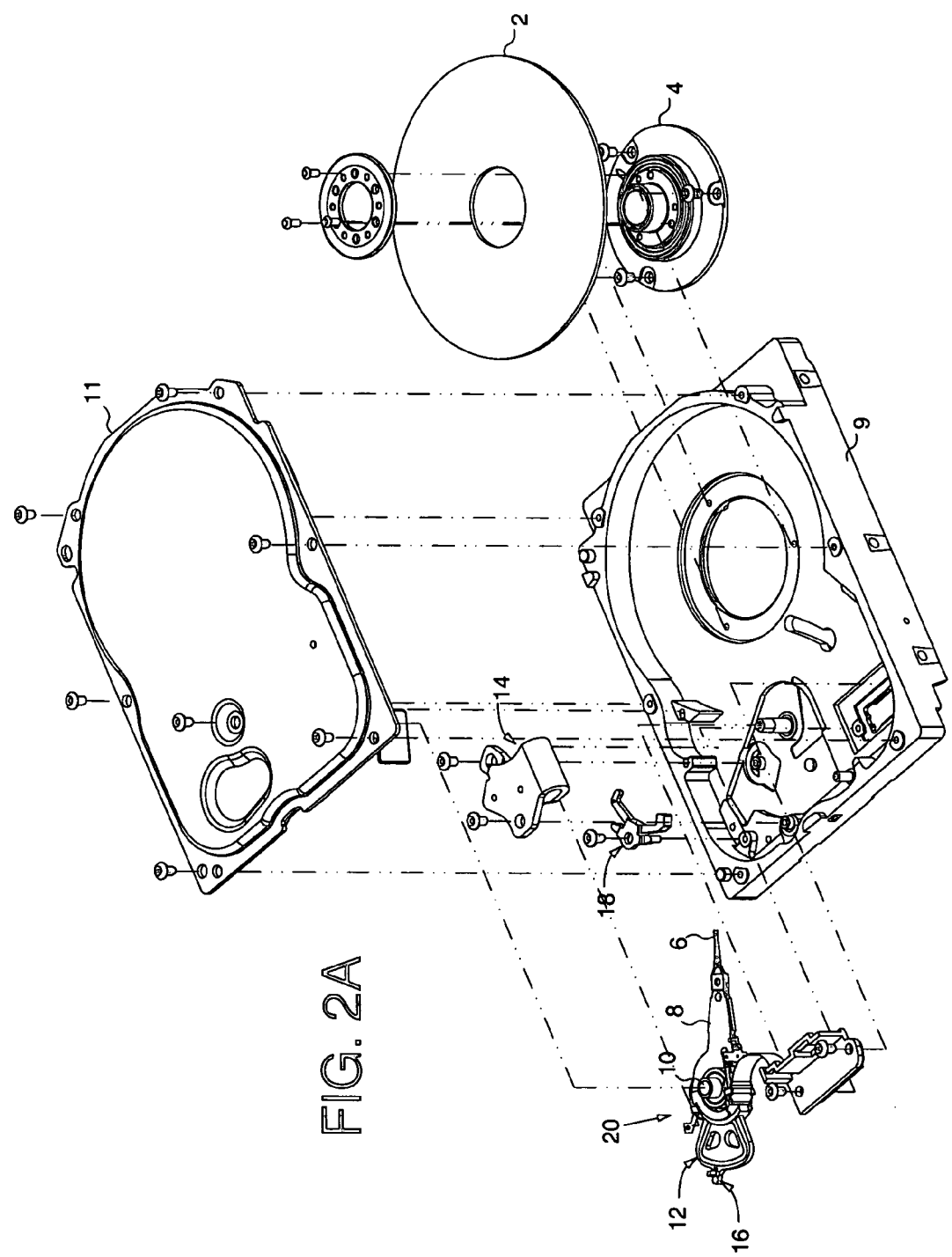

DISK DRIVE COMPRISING AN OPTICAL SENSOR FOR VIBRATION MODE COMPENSATION

BACKGROUND OF THE INVENTION

1. Field of the Invention

The present invention relates to disk drives for computer systems. More particularly, the present invention relates to a disk drive comprising an optical position sensor for vibration mode compensation.

2. Description of the Prior Art

FIG. 1 shows an exploded view of a prior art disk drive comprising a disk 2 rotated by a spindle motor 4, and a head 6 coupled to a distal end of an actuator arm 8 which is rotated about a pivot 10 by a voice coil motor (VCM) in order to actuate the head 6 over the disk 2. The disk 2, spindle motor 4, head 6, actuator arm 8, and VCM are enclosed in a head disk assembly (HDA) comprising a base 9 and a cover 11. The VCM comprises a voice coil 12 coupled to the base of the actuator arm 8 and one or more permanent magnets attached to a yoke 14. When the voice coil 12 is energized with current, the resulting magnetic flux interacts with the magnetic flux of the permanent magnets to generate a torque that rotates the actuator arm 8 about the pivot 10. A tang 16 attached to the actuator arm 8 interacts with a crash stop 18 to limit the stroke of the actuator arm 8, and also provides a latching mechanism (e.g., using a magnet) to maintain the actuator arm 8 in a latched position while the disk drive is powered down. Alternatively, the actuator arm 8 may be parked on a ramp located at the outer periphery of the disk 2 when the disk drive is powered down.

The disk 2 typically comprises embedded servo sectors recorded at a periodic interval around the disk 2 which provide coarse position information (e.g., a track address) used to seek the head 6 to a target track, and fine positioning information (e.g., servo bursts) used to maintain the head 6 over the target track (tracking) during read/write operations. Control circuitry within the disk drive processes the position information detected from the servo sectors to implement a position controlled servo system.

Seeking and tracking operations can excite vibration modes of the actuator arm assembly and VCM that may interfere with the frequency response of the servo system. In particular, exciting the arm torsion and arm sway modes can limit the servo bandwidth leading to excessive settling times, poor disturbance rejection, and poor tracking.

There is, therefore, a need to compensate for vibration modes of the actuator arm assembly and VCM in a disk drive.

SUMMARY OF THE INVENTION

An embodiment of the present invention comprises a disk drive including a disk having a plurality of servo sectors comprising servo information, wherein the servo sectors define a plurality of servo tracks. The disk drive further comprises an actuator arm, a head attached to a distal end of the actuator arm, a voice coil motor for rotating the actuator arm about a pivot, and an optical sensor operable to generate a first position signal representing a position of the actuator arm with respect to the disk, wherein the first position signal is substantially unaffected by a vibration mode of the actuator arm. Control circuitry within the disk drive processes the servo information to generate a second position signal representing a position of the head with respect to the disk, wherein the second position signal comprises a significant component due to the vibration mode of the actuator arm. The control circuitry generates a control signal applied to the voice coil motor in response to the first and second position signals.

In one embodiment, the servo information comprises servo bursts.

In another embodiment of the present invention, the optical sensor comprises a light source, a plurality of light sensitive sensors positioned to receive light from the light source, and a substantially opaque element positioned between the light source and the light sensitive sensors configured to control an amount of light at least one of the plurality of light sensitive sensors detects relative to the position of the actuator arm. In one embodiment, the opaque element is coupled to a side of the actuator arm proximate the pivot. In another embodiment, the plurality of light sensitive sensors comprise a first sensor and a second sensor, and the optical sensor further comprises a differential amplifier operable to compute a difference between a first amount of light detected by the first sensor and a second amount of light detected by the second sensor, wherein the difference represents the position of the actuator arm. In yet another embodiment, the plurality of light sensitive sensors comprise a first sensor and a second sensor, the optical sensor further comprises a differential amplifier operable to compute a sum of the first amount of light detected by the first sensor and the second amount of light detected by the second sensor, and an intensity of the light is controlled in response to the sum.

In still another embodiment, the control signal applied to the voice coil motor is generated in response to a difference between the first and second position signals.

In yet another embodiment, the control circuitry comprises a servo compensator for generating the control signal in response to the first and second position signals. In one embodiment, the servo compensator comprises a first filter for filtering the first position signal to generate a first filtered signal, a second filter for filtering the second position signal to generate a second filtered signal, and an adder for combining the first and second filtered signals.

Another embodiment of the present invention comprises a method of operating a disk drive, the disk drive comprising a disk having a plurality of servo sectors comprising servo information, the servo sectors defining a plurality of servo tracks, an actuator arm, a head attached to a distal end of the actuator arm, a voice coil motor for rotating the actuator arm about a pivot, and an optical sensor. The method comprises the steps of generating a first position signal at the optical sensor representing a position of the actuator arm with respect to the disk, wherein the first position signal is substantially unaffected by a vibration mode of the actuator arm, processing the servo information to generate a second position signal representing a position of the head with respect to the disk, wherein the second position signal comprises a significant component due to the vibration mode of the actuator arm, and generating a control signal applied to the voice coil motor in response to the first and second position signals.

BRIEF DESCRIPTION OF THE DRAWINGS

FIG. 2A shows a disk drive according to an embodiment of the present invention comprising an optical sensor for detecting a position of the actuator arm substantially unaffected by a vibration mode of the actuator arm.

DESCRIPTION OF THE PREFERRED EMBODIMENTS

Figure 2B:
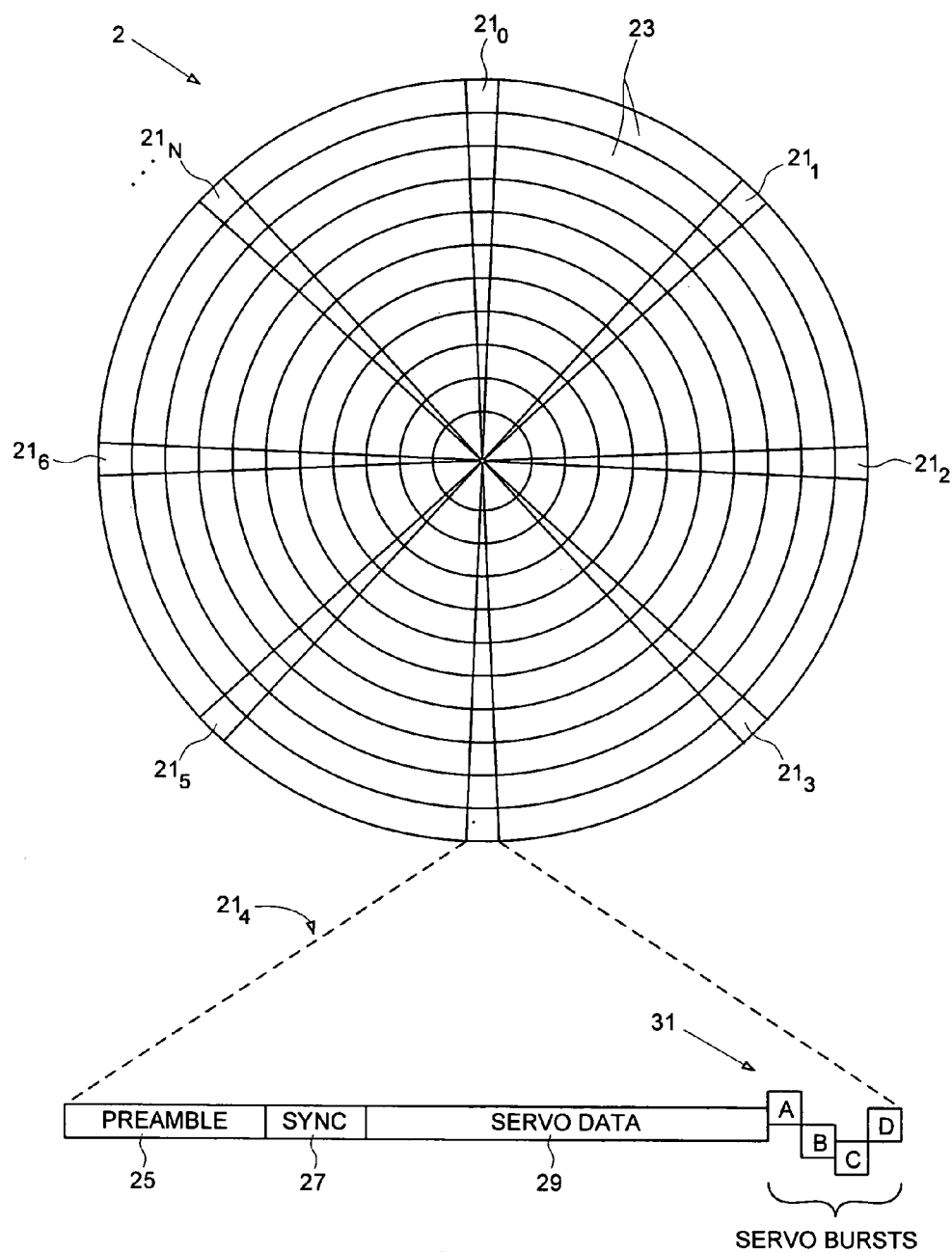
FIG. 2B shows a format of a disk having a plurality of servo sectors comprising servo information, the servo sectors defining a plurality of servo tracks.

FIG. 2A shows a disk drive according to an embodiment of the present invention comprising a disk 2 having a plurality of servo sectors $21_0$-$21_N$ (FIG. 2B) comprising servo information, wherein the servo sectors $21_0$-$21_N$ define a plurality of servo tracks 23. The disk drive further comprises an actuator arm 8, a head 6 attached to a distal end of the actuator arm 8, a voice coil motor for rotating the actuator arm 8 about a pivot 10, and an optical sensor 20 operable to generate a first position signal representing a position of the actuator arm 8 with respect to the disk 2, wherein the first position signal is substantially unaffected by a vibration mode of the actuator arm 8. Control circuitry within the disk drive processes the servo information to generate a second position signal representing a position of the head 6 with respect to the disk 2, wherein the second position signal comprises a significant component due to the vibration mode of the actuator arm 8. The control circuitry generates a control signal applied to the voice coil motor in response to the first and second position signals.

Any suitable control circuitry may be employed to implement the described embodiments of the present invention. In one embodiment, the control circuitry comprises a microprocessor executing instructions which may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry comprises suitable logic circuitry, such as state machine circuitry. In still another embodiment, the control circuitry comprises suitable discrete-time circuitry and/or analog circuitry.

In the disk format shown in FIG. 2B, each servo sector 211 comprises a preamble 25 for storing a periodic pattern which allows proper gain adjustment and timing synchronization of the read signal, and a sync mark 27 for storing a special pattern used to symbol synchronize to a servo data field 29. The servo data field 29 stores coarse head positioning information, such as a track address, used to position the head 6 over a target data track during a seek operation. Each servo sector 211 further comprises groups of servo bursts 31 (e.g., A, B, C and D bursts) which comprise a number of consecutive transitions recorded at precise intervals and offsets with respect to a data track centerline. The groups of servo bursts 31 provide fine head position information used for centerline tracking while accessing a data track during write/read operations.

Figure 1:
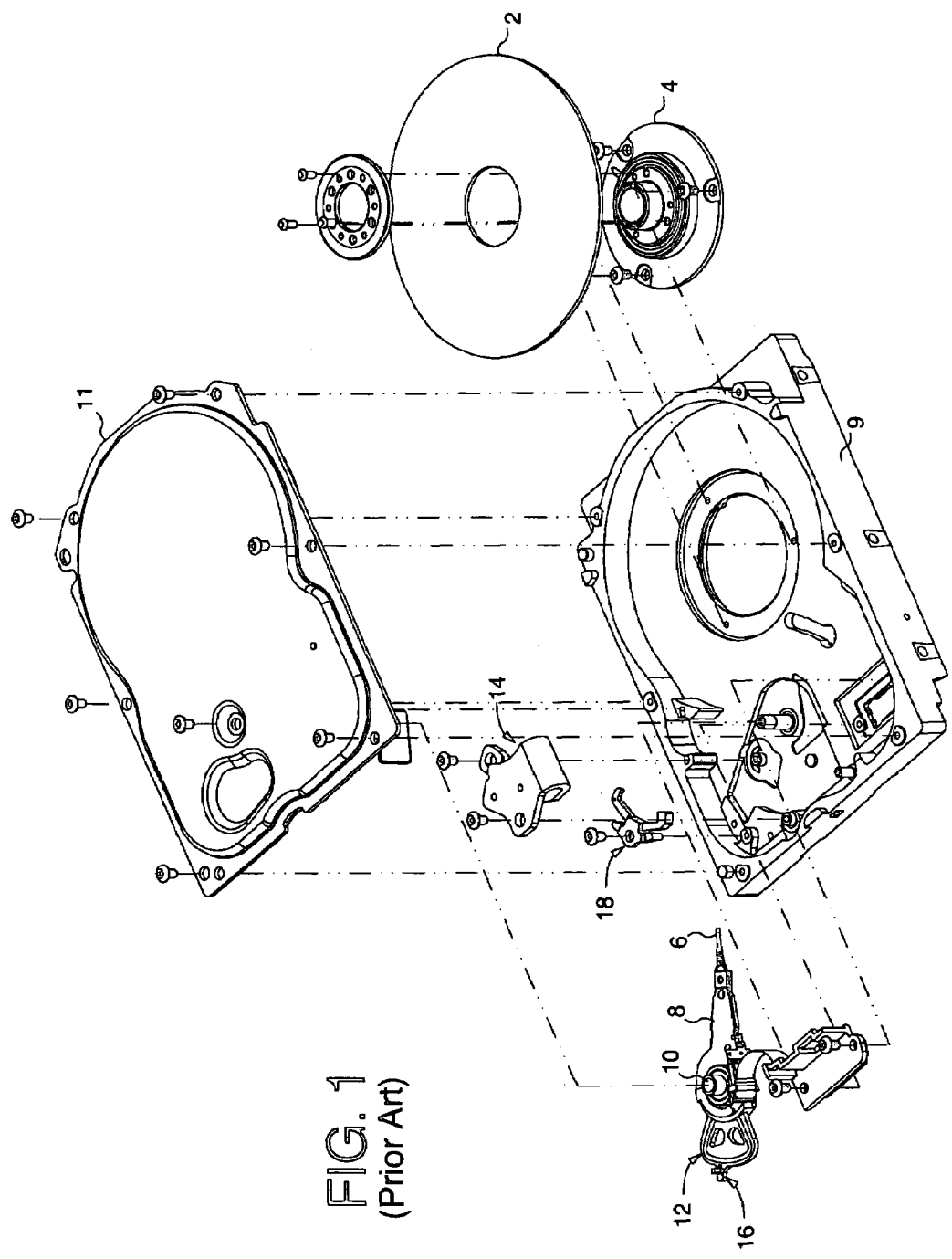
FIG. 1 shows a prior art disk drive comprising a disk, a head attached to an actuator arm, and a VCM for rotating the actuator arm about a pivot in order to position the head over the disk.

Similar to the prior art disk drive of FIG. 1, the disk drive shown in the embodiment of FIG. 2A comprises a spindle motor 4 for rotating the disk 2, and a VCM for rotating the actuator arm 8 about a pivot 10 to position the head 6 over the disk 2. The VCM comprises a voice coil 12 coupled to the base of the actuator arm 8 and one or more permanent magnets attached to a yoke 14. When the voice coil 12 is energized with current, the resulting magnetic flux interacts with the magnetic flux of the permanent magnets to generate a torque that rotates the actuator arm 8 about the pivot 10. A tang 16 attached to the actuator arm 8 interacts with a crash stop 18 to limit the stroke of the actuator arm 8, and also provides a latching mechanism (e.g., using a magnet) to maintain the actuator arm 8 in a latched position while the disk drive is powered down. Alternatively, the actuator arm 8 may be parked on a ramp mounted at the outer periphery of the disk 2 when the disk drive is powered down. The disk 2, spindle motor 4, head 6, actuator arm 8, crash stop 18, and VCM are enclosed in an HDA comprising a base 9 and a cover 11.

Any suitable optical sensor 20 may be employed in embodiments of the present invention. In an embodiment of the present invention illustrated in FIG. 3, the optical sensor 20 comprises a light source 22, a plurality of light sensitive sensors 26 positioned to receive light from the light source 22, and a substantially opaque element 24 positioned between the light source 22 and the light sensitive sensors 26 configured to control an amount of light at least one of the plurality of light sensitive sensors 26 detects relative to the position of the actuator arm 8. The light source 22 comprises a light emitting device, such as a light emitting diode (LED), that is stationary relative to the base 9. The opaque element 24 comprises a linear element, such as a wire, coupled to the actuator arm 8. The light source 22 and light sensitive sensors 26 are aligned substantially horizontally with respect to the surface of the disk 2 (and the planar surface of the actuator arm 8). The light sensitive sensors 26 are stationary relative to the base 9 such that the opaque element 24 moves with the actuator arm 8 relative to the light sensitive sensors 26, thereby changing the amount of light at least one of the light sensitive sensors 26 detects.

Figure 3:
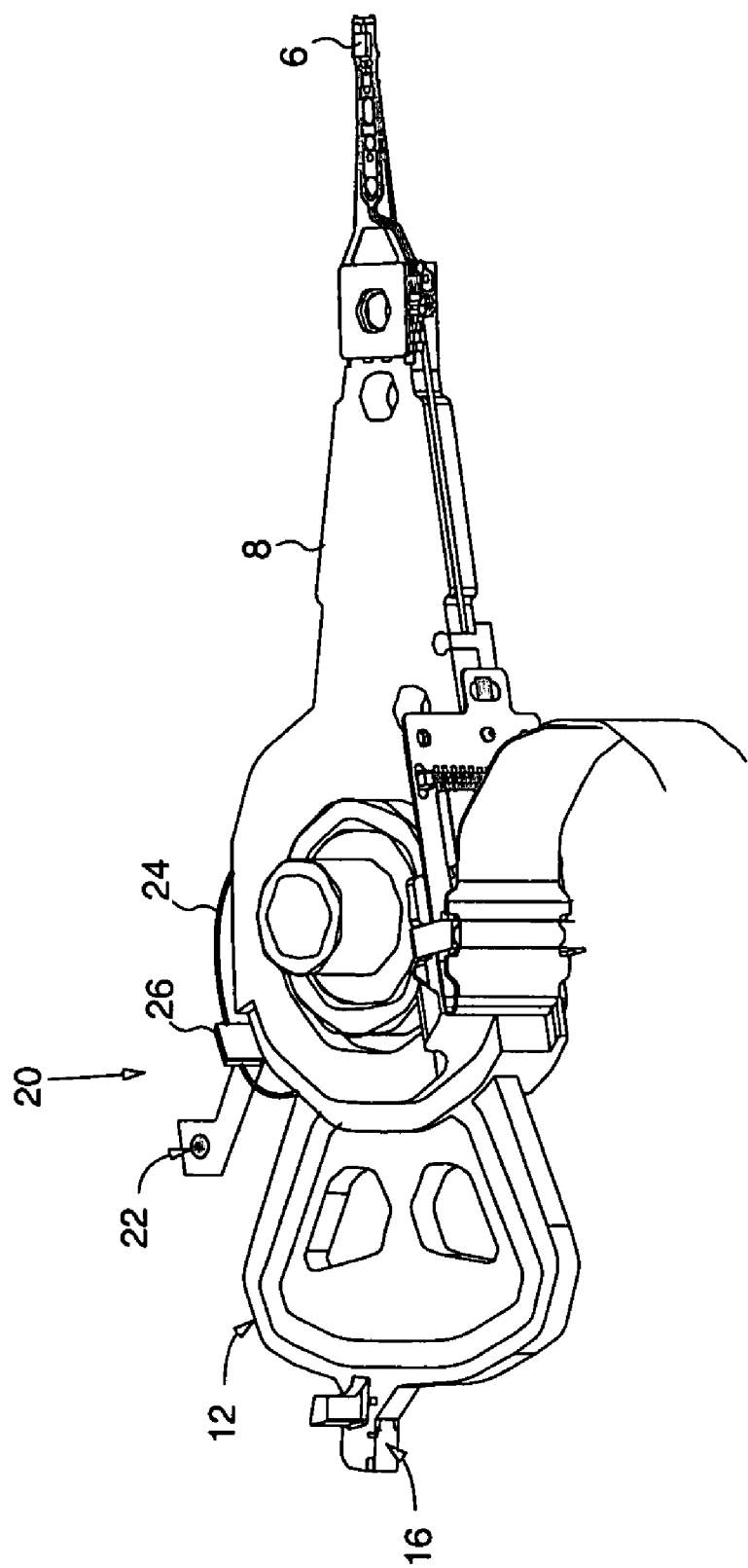
FIG. 3 shows an actuator arm according to an embodiment of the present invention wherein the optical sensor comprises a light source, a plurality of light sensitive sensors, and an opaque element positioned between the light source and the light sensitive sensors.
Figure 4A:
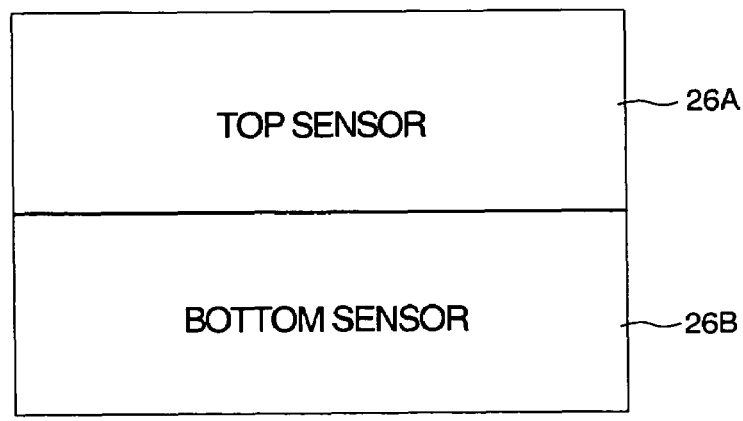
FIG. 4A shows an embodiment of the present invention wherein the plurality of light sensitive sensors comprise top and bottom sensors.

In the embodiment of FIG. 3, the light sensitive sensors 26 comprise a top sensor 26A and a bottom sensor 26B as illustrated in FIG. 4A. Any suitable light sensitive sensor 26 may be employed in embodiments of the present invention, such as a photo resistor, a charge-coupled device (CCD), a CdS/CdSe photo sensor, or a silicon based photovoltaic cell (photodiode). A light sensitive sensor 26 having a high bandwidth (e.g., a photovoltaic cell) may be preferred depending on the application. The light sensitive sensors 26A and 26B are shown adjacent one another in the embodiment of FIG. 4A, and may be integrated into a single component (e.g., separate regions of a CCD or CdS/CdSe photo sensor). In an alternative embodiment, the light sensitive sensors 26A and 26B may be manufactured as separate components and may also be separated by any suitable distance.

Figure 4B:
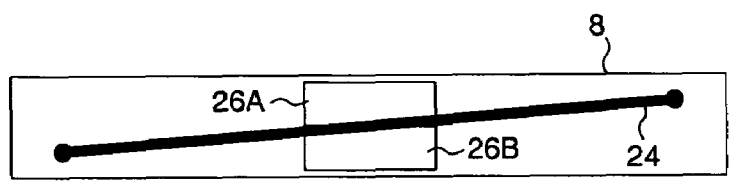
FIGS. 4B-4D illustrate how the opaque element controls the amount of light each sensor detects relative to the position of the actuator arm according to an embodiment of the present invention.
Figure 4C:
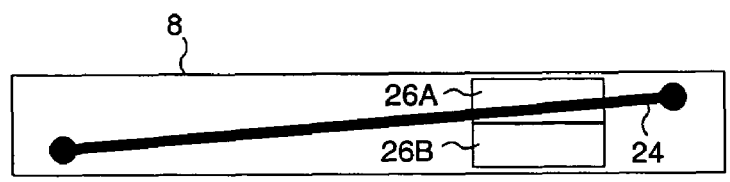
Figure 4D:
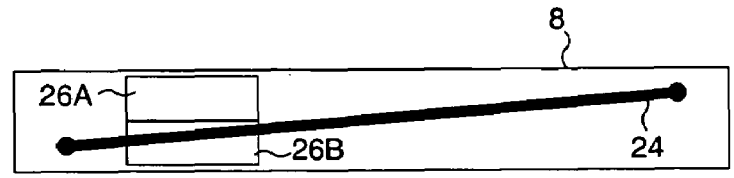

Operation of the optical sensor 20 shown in FIG. 3 is illustrated in FIGS. 4B-4D, which show a side view of the actuator arm 8 from the perspective of the light source 22 looking toward the light sensitive sensors 26A and 26B. In this embodiment, the opaque element 24 (a linear element) has a sloping angle with respect to the actuator arm 8. In FIG. 4B, the actuator arm 8 is positioned near the middle of its stroke such that each light sensitive sensor 26A and 26B receives an equal amount of light. In FIG. 4C, the actuator arm 8 is rotated in one direction (e.g., toward the OD) such that the bottom sensor 26B receives more light than the top sensor 26A, and in FIG. 4D the actuator arm 8 is rotated in the opposite direction (e.g., toward the ID) such that top sensor 26A receives more light than the bottom sensor 26B.

Although the substantially opaque element 24 is shown in the embodiment of FIG. 3 as comprising a linear element having a sloping angle, the opaque element may comprise any suitable shape, such as a planar shape. In another embodiment, the opaque element 24 may comprise one or more apertures for controlling an amount of light passing through the opaque element 24. In addition, the opaque element 24 may be positioned in any suitable orientation with respect to the actuator arm 8 and light sensitive sensors 26. For example, the opaque element 24 may be curved rather than linear.

Figure 5A:
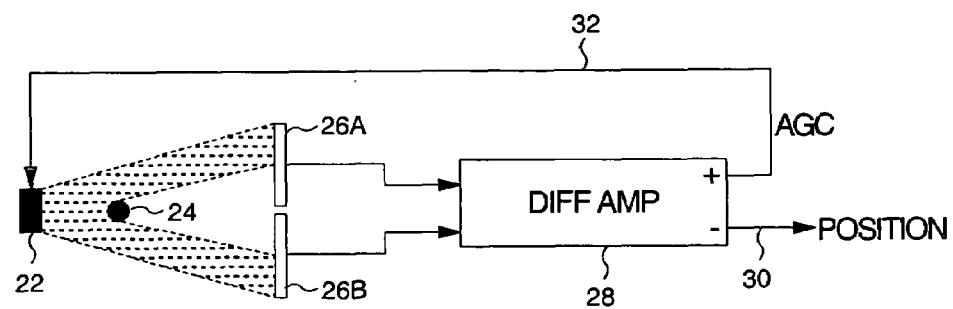
FIG. 5A shows an embodiment of the present invention wherein a differential amplifier computes a difference between the sensor outputs representing the position of the actuator arm, and the sum of the sensor outputs is used to control an intensity of the light from the light source.

In one embodiment, the output of the light sensitive sensors 26 is used to adjust the intensity of the light emitted by the light source in an automatic gain control (AGC) loop. FIG. 5A shows an embodiment of the present invention wherein a differential amplifier 28 computes a difference between a first amount of light detected by the first sensor 26A and a second amount of light detected by the second sensor 26B, wherein the difference 30 represents the position of the actuator arm 8. Also in the embodiment of FIG. 5A, the differential amplifier 28 computes a sum 32 of the first amount of light detected by the first sensor 26A and the second amount of light detected by the second sensor 26B, wherein an intensity of the light emitted by the light source is controlled in response to the sum 32 in an AGC loop.

Figure 5B:
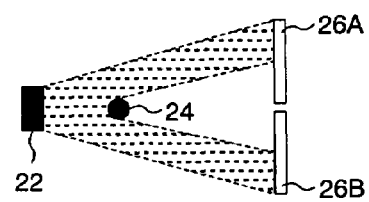
FIGS. 5B-5D illustrate how the amount of light each sensor detects changes relative to the position of the actuator arm according to an embodiment of the present invention.
Figure 5C:
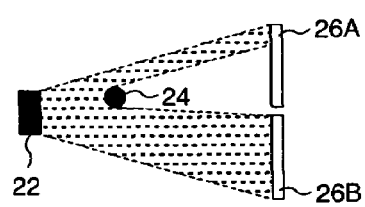
Figure 5D:
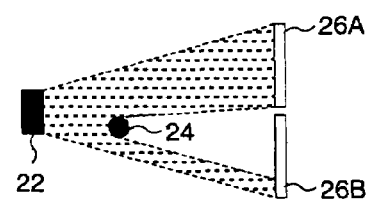

FIGS. 5B-5D correspond to FIGS. 4B-4D and illustrate how the position of the opaque element 24 changes to control the amount of light each light sensitive sensor detects relative to the position of the actuator arm 8. FIG. 5B shows that both light sensitive sensors 26A and 26B receive the same amount of light when the actuator arm 8 is near the middle of its stroke, FIG. 5C shows that bottom sensor 26B receives more light as the actuator arm 8 moves toward the OD, and FIG. 5D shows that the top sensor 26A receives more light as the actuator moves toward the ID. The difference between the amount of light each sensor detects therefore represents the position of the actuator arm 8.

Figure 6A:
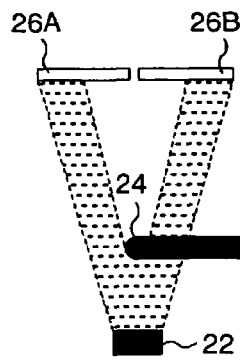
FIGS. 6A-6D illustrate an alternative embodiment of the present invention wherein the light source and light sensitive sensors are aligned vertically with respect to the surface of the disk.
Figure 6B:
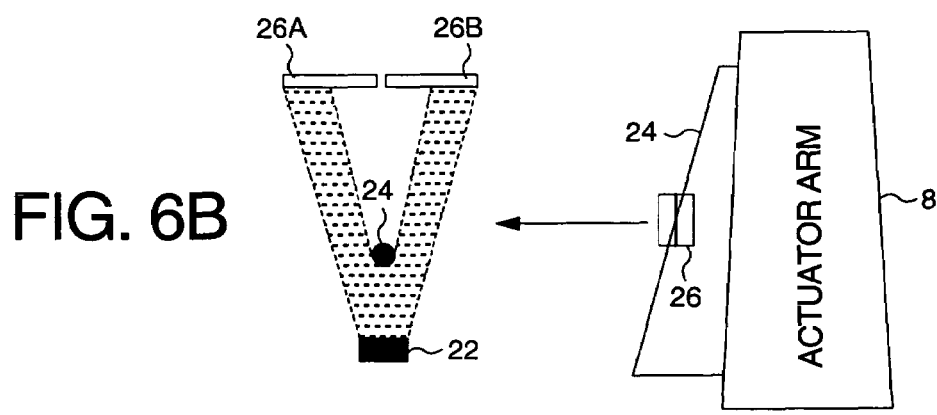
Figure 6C:
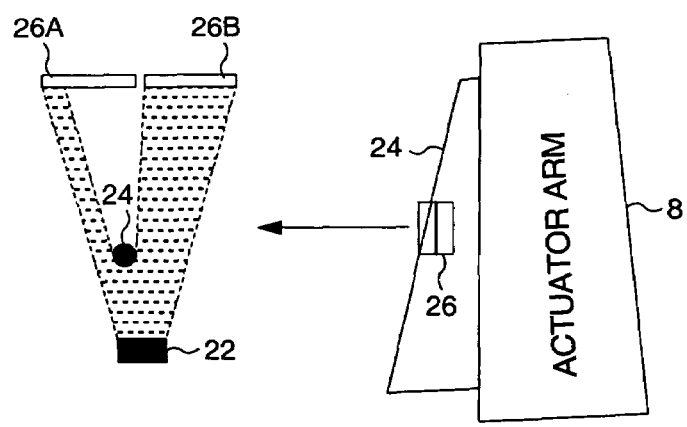
Figure 6D:
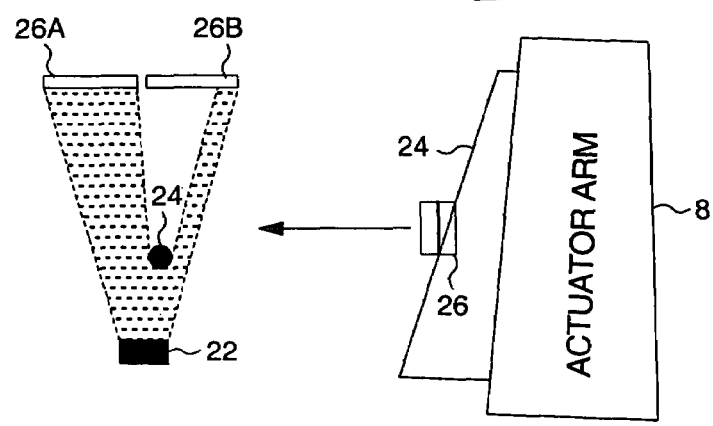

Any suitable configuration for the light source and light sensitive sensors may be employed in embodiments of the present invention. FIG. 6A shows an alternative embodiment of the present invention wherein the light source (e.g., LED 22) and light sensitive sensors 26A and 26B are aligned substantially vertically with respect to the disk 2 (and planar surface of the actuator arm 8). FIGS. 6B-6D illustrate how the amount of light each light sensitive sensor 26A and 26B detects changes with the changing position of the actuator arm 8. FIGS. 6B-6D also illustrate an alternative shape for the opaque element 24; however, any suitable shape may be employed.

Figure 7A:
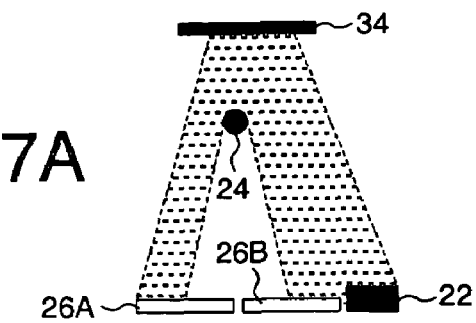
FIG. 7A illustrates an embodiment of the present invention wherein the light source comprises a light emitting device and a mirror.
Figure 7B:
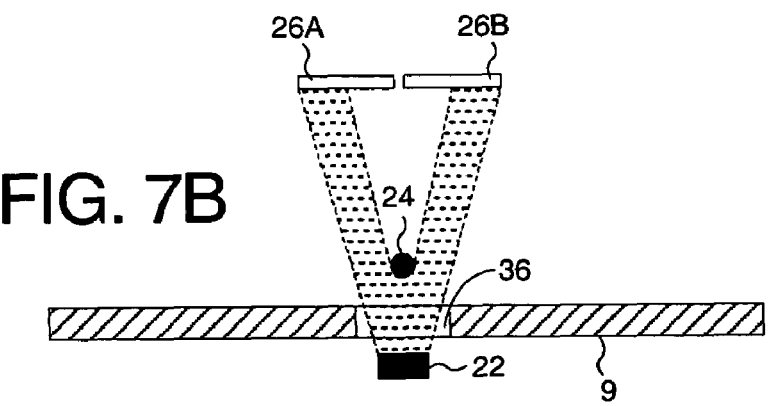
FIG. 7B shows an embodiment of the present invention wherein the HDA comprises a window, wherein the light passes through the window.
Figure 7C:
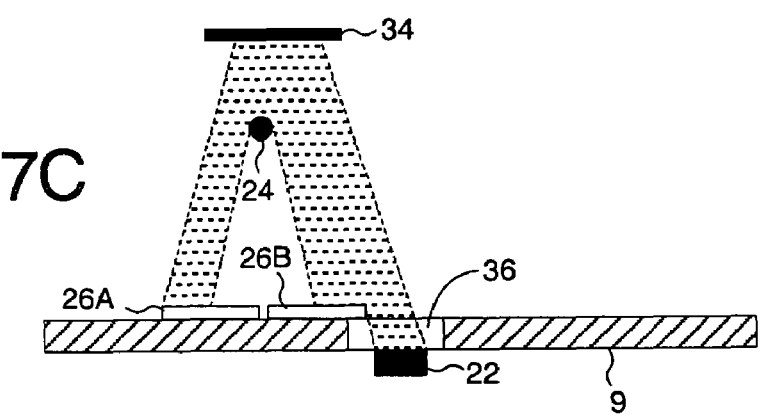
FIG. 7C shows an embodiment of the present invention wherein the light sensitive sensors are located inside the HDA.
Figure 7D:
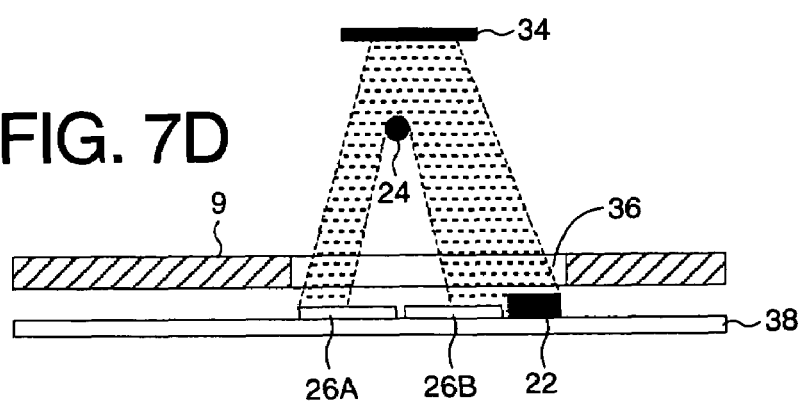
FIG. 7D shows an embodiment of the present invention wherein the light source and light sensitive sensors are mounted on a printed circuit board outside the HDA.

FIG. 7A illustrates another alternative configuration for the light source and light sensitive sensors. In this embodiment, the light source comprises a light emitting device 22 (e.g., an LED) and a mirror 34 for reflecting the light toward the light sensitive sensors 26A and 26B. FIG. 7B shows yet another configuration wherein the base 9 of the HDA comprises a window 36, and the light emitted by the light emitting device 22 passes through the window 36. This allows the light emitting device 22 to be located outside of the HDA. FIG. 7C shows an embodiment employing the mirror 34 of FIG. 7A and the window 36 of FIG. 7B, wherein the light sensitive sensors 26A and 26B are located inside the HDA. FIG. 7D shows an embodiment wherein both the light emitting device 22 and the light sensitive sensors 26A and 26B are mounted on a printed circuit board 38 located outside the HDA. In this embodiment, the light passes through the window 36, reflects off of the mirror 34, and then passes back through the window 36.

Figure 8:
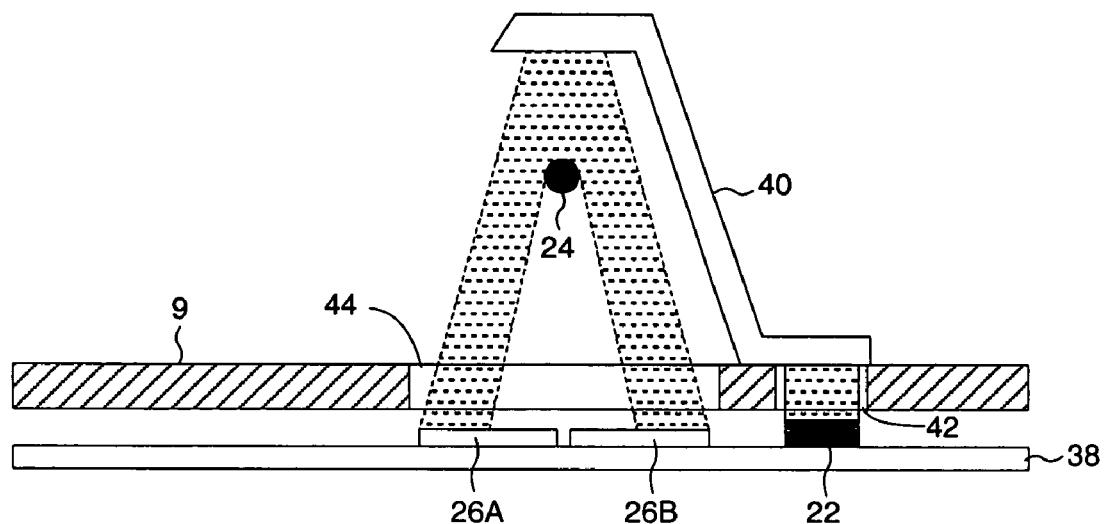
FIG. 8 shows an embodiment of the present invention wherein the light source comprises a light pipe, and the HDA comprises two windows.

FIG. 8 shows yet another embodiment of the present invention wherein the light source comprises a light emitting device 22 and a suitable light pipe 40 (e.g., a fiber optic). The light emitted by the light emitting device 22 passes through a first window 42 in the base 9 of the HDA, and is directed from one end of the light pipe 40 to the other end. The light then shines toward the light sensitive sensors 26A and 26B with appropriate shading by the opaque element 24. In this embodiment, the light passes through a second window 44 in the HDA before reaching the light sensitive sensors 26A and 26B located outside of the HDA.

Figure 9A:
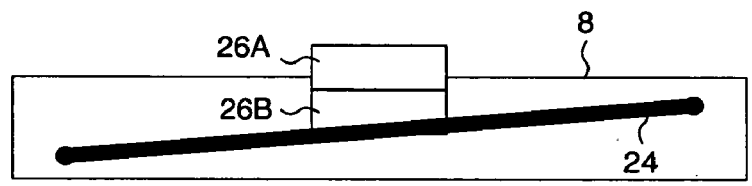
FIGS. 9A-9C illustrate an alternative embodiment of the present invention wherein the opaque element controls an amount of light one of the light sensitive sensors detects.
Figure 9B:
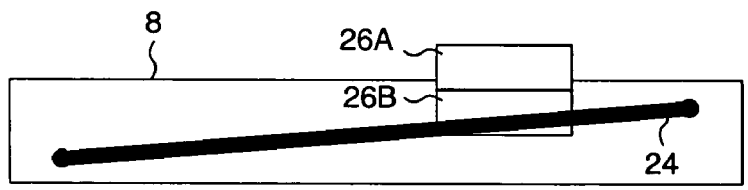
Figure 9C:
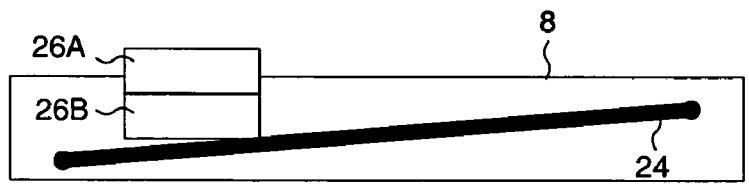

FIGS. 9A-9C illustrate another embodiment of the present invention wherein the opaque element 24 is configured to control the amount of light received only by the bottom sensor 26B. When the actuator arm 8 is near the middle of its stroke, as shown in FIG. 9A, the opaque element covers a predetermined area of the bottom sensor 26B. As the actuator arm 8 rotates toward the OD as shown in FIG. 9B, more of the opaque element 24 covers the bottom sensor 26B, and as the actuator arm 8 rotates toward the ID as shown in FIG. 9C, less of the opaque element 24 covers the bottom sensor 26B. In this embodiment, the output from both light sensitive sensors 26A and 26B may be used to control the intensity of the light in an AGC loop, for example, using the differential amplifier 28 shown in FIG. 5A.

In one embodiment, the optical sensor 20 for detecting the position of the actuator arm 8 is calibrated for each disk drive to compensate for manufacturing tolerances. Any suitable technique may be employed to calibrate the optical sensor 20, such as positioning the actuator arm 8 to a known position and measuring the output of the light sensitive sensors 26. In one embodiment, the actuator arm 8 is pressed against a crash stop (e.g., at the OD or ID of its stroke) in order to calibrate the optical sensor 20. In another embodiment, embedded servo sectors are recorded on the surface of the disk 2 to define a number of radially spaced, concentric servo tracks, and the position of the actuator arm 8 is detected relative to the location of the head 6 with respect to the servo tracks. For example, the actuator arm 8 may be rotated by the VCM until the head 6 detects the middle servo track on the surface of the disk 2. The difference between the sensor outputs can be used as a DC offset that may then be subtracted from the first position signal generated by the optical sensor 20 in order to more accurately represent a position of the actuator arm 8.

Figure 10:
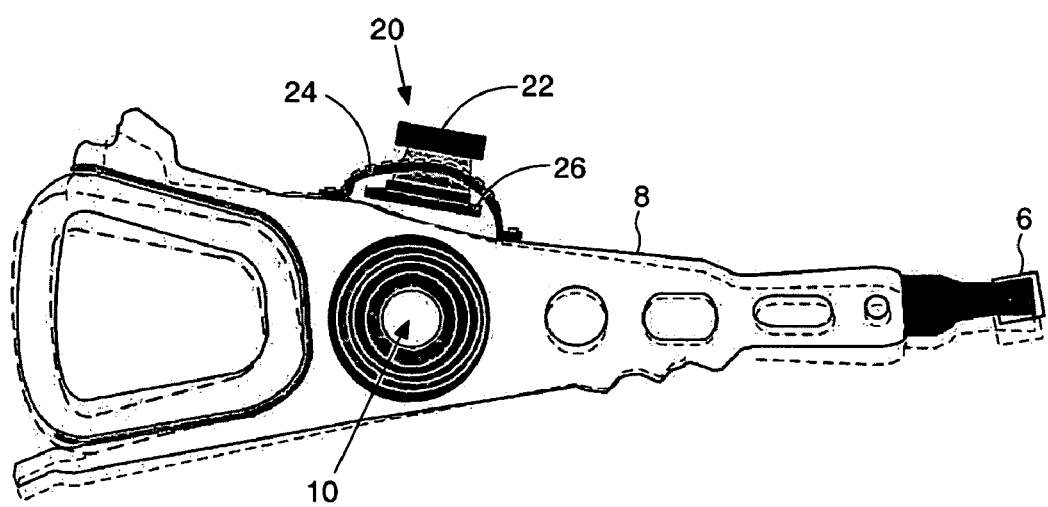
FIG. 10 shows an embodiment of the present invention wherein the opaque element of the optical sensor is coupled to a side of the actuator arm proximate the pivot.

FIG. 10 shows an embodiment of the present invention wherein the opaque element 24 is coupled to a side of the actuator arm 8 proximate the pivot 10 so that the optical sensor 20 is substantially unaffected by at least one vibration mode of the actuator arm 8. The butterfly vibration mode is shown in FIG. 10, which causes the actuator arm 8 to bend in-plane with the pivot plane about the pivot 10 (upward in FIG. 10). The output of the optical sensor 20 is substantially unaffected by this vibration mode since the opaque element 24 remains substantially stationary with respect to the portion of the actuator arm 8 adjacent the pivot 10. Thus, by coupling the opaque element to the actuator arm 8 proximate the pivot 10, the opaque element is substantially unaffected by vibration modes that bend the actuator arm 8 about the pivot 10 in-plane with the pivot plane.

Figure 11A:
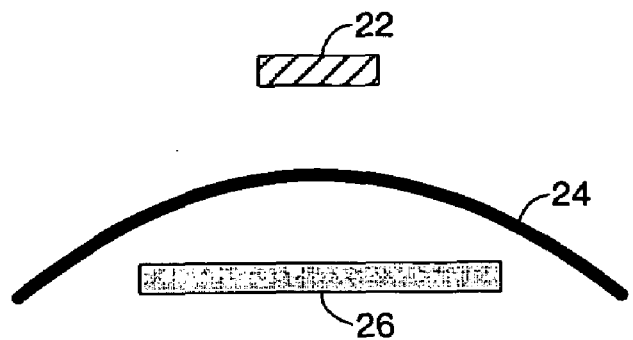
FIGS. 11A-11C illustrate how in one embodiment of the present invention an optical sensor AGC loop compensates for vibrations of the actuator arm that cause the actuator arm to bend, such as the butterfly mode vibration.
Figure 11B:
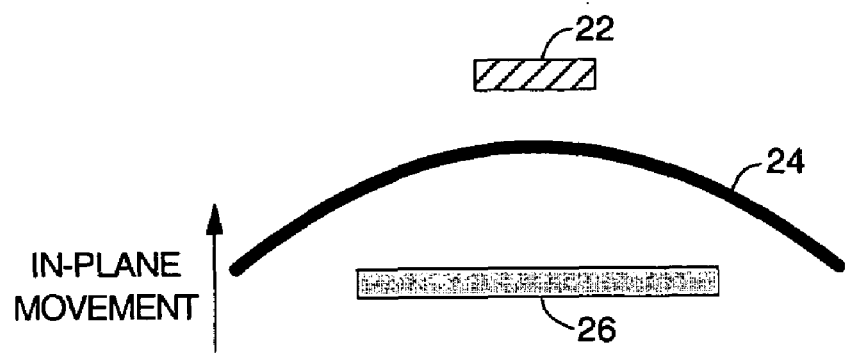
Figure 11C:
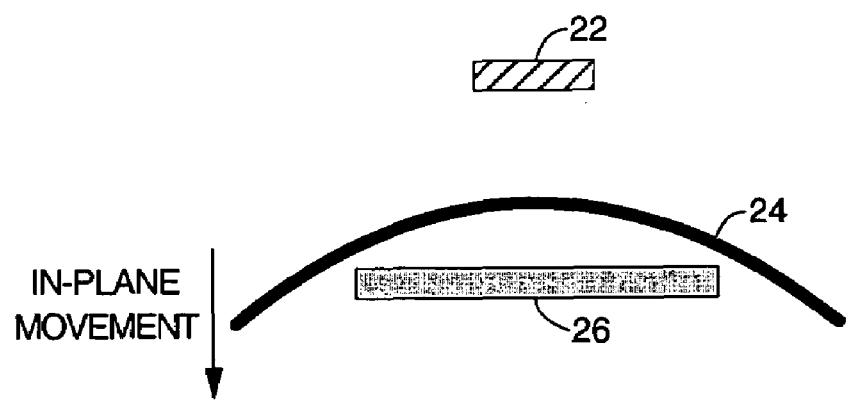

The in-plane bending may cause an in-plane displacement of the opaque element as illustrated in FIGS. 11A-11C. However, the effect of the automatic gain control (AGC) loop of FIG. 5A compensates for this in-plane movement by adjusting the intensity of the light source 22. FIG. 11A shows the opaque element 24 in a normal position with respect to the light sensitive sensors 26 (no vibration) wherein the AGC loop adjusts the intensity of the light source 22 to a nominal setting. FIG. 11B shows the opaque element 24 moving toward the light source 22 due to the actuator arm 8 shown in FIG. 10 bending in-plane about the pivot 10 (upward in FIG. 10) due to a vibration, wherein the AGC loop increases the intensity of the light source 22 to compensate for the greater portion of both light sensors obscured by the opaque element 24. FIG. 11C shows the opaque element 24 moving away from the light source 22 due to the actuator arm 8 shown in FIG. 10 bending in-plane about the pivot 10 in the opposite direction (downward in FIG. 10) due to a vibration, wherein the AGC loop decreases the intensity of the light source 22.

Figure 12A:
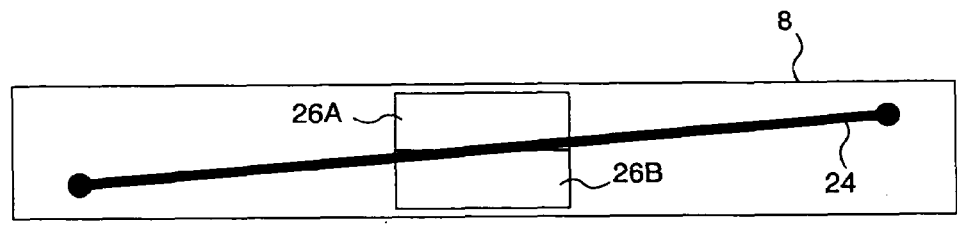
FIGS. 12A-12C illustrate how in one embodiment of the present invention the optical sensor compensates for rotations of the actuator arm orthogonal to the pivot plane.
Figure 12B:
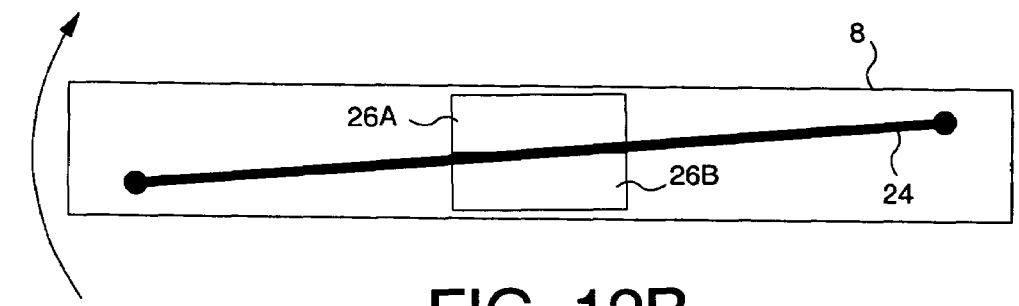
Figure 12C:
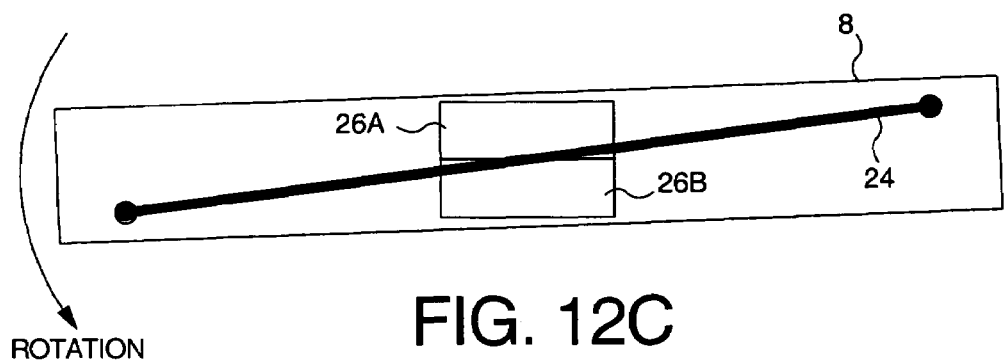

FIGS. 12A-12C illustrate how an embodiment of the optical sensor 20 as described above also compensates for rotations of the actuator arm 8 orthogonal to the pivot plane. FIG. 12A shows the actuator arm 8 in a normal position (no rotation) wherein each light sensitive sensor 26A and 26B detects a certain amount of light. When the actuator arm 8 is subject to a rotational vibration as illustrated in FIGS. 12B and 12C, the difference between the outputs of the light sensitive sensors 26A and 26B remains substantially unchanged, and therefore the detected position of the actuator arm 8 remains substantially unchanged.

Figure 13:
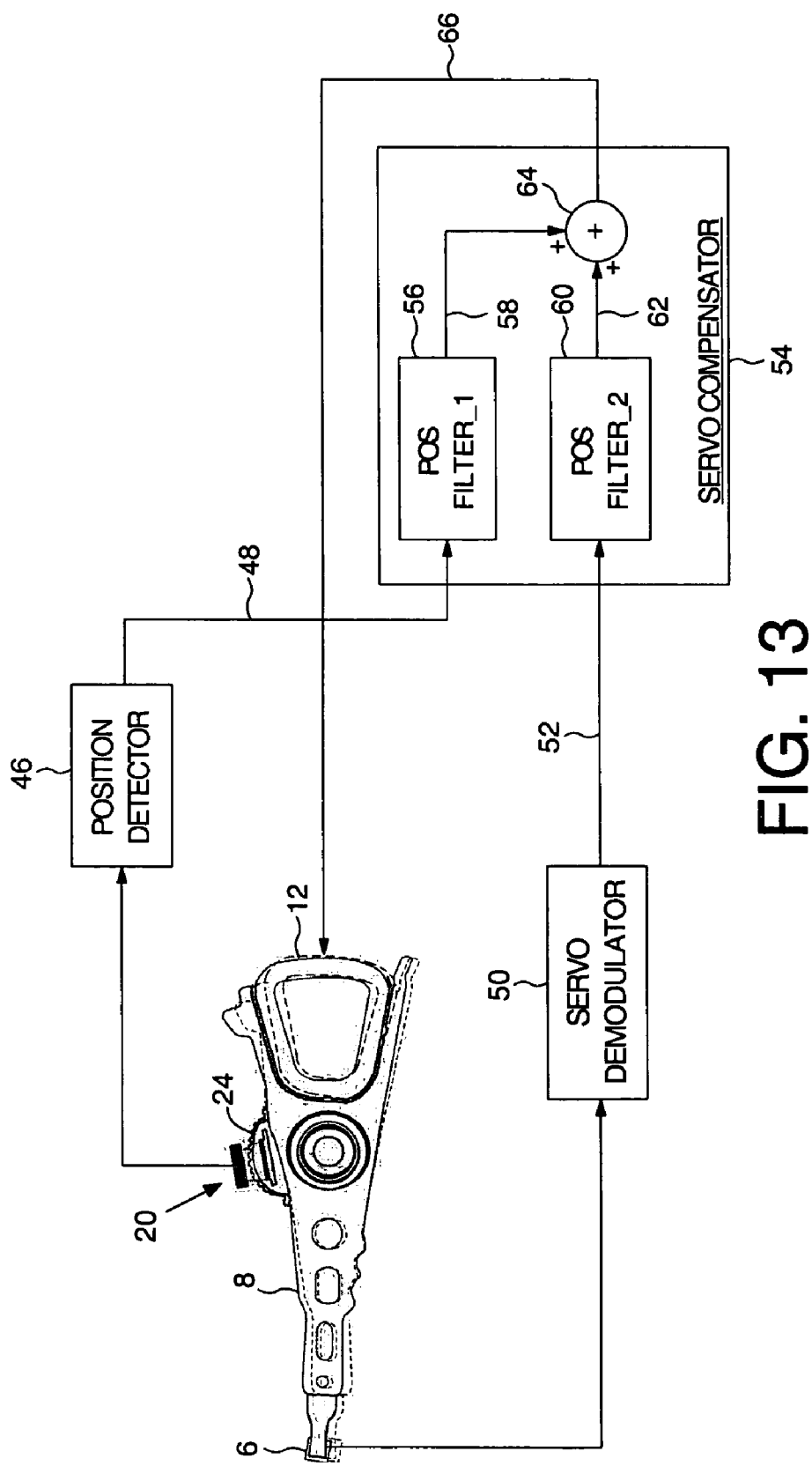
FIG. 13 shows an embodiment of the present invention wherein the servo compensator comprises first and second filters for filtering the first and second position signals, and an adder for combining the filtered signals.

FIG. 13 illustrates an embodiment of the present invention wherein the disk drive comprises a position detector 46 for processing the output of the optical sensor 20 (e.g., by computing a difference between the light sensitive sensors 26A and 26B) to generate the first position signal 48 representing the position of the actuator arm 8 with respect to the disk 2, wherein the first position signal 48 is substantially unaffected by a vibration mode of the actuator arm 8. A servo demodulator 50 demodulates the servo sectors $21_0$-$21_N$ (track address and servo bursts) to generate the second position signal 52 representing a position of the head 6 with respect to the disk 2, wherein the second position signal 52 comprises a significant component due to the vibration mode of the actuator arm 8. Referring to the example shown in FIG. 13, the in-plane bending of the actuator arm 8 due to the butterfly mode will cause a radial displacement of the head 6 and an associated disturbance in the second position signal 52 without substantially affecting the first position signal 48 generated by the optical sensor 20.

Any suitable servo compensation technique may be employed in embodiments of the present invention to compensate for vibration modes. FIG. 13 shows an embodiment of the present invention wherein a servo compensator 54 comprises a first filter 56 for filtering the first position signal 48 to generate a first filtered signal 58, and a second filter 60 for filtering the second position signal 52 to generate a second filtered signal 62. An adder 64 combines the first filtered signal 58 with the second filtered signal 62 to generate a control signal 66 applied to the voice coil 12. Any suitable frequency response may be selected for the first and second filters 56 and 60 in order to compensate for one or more vibration modes. For example, the target vibration may manifest in the mid-range frequencies of the position signals. Therefore, in one embodiment the first filter 56 may comprise a band-pass filter for extracting the mid-range frequency component from the first position signal 48 (which is substantially unaffected by the vibration mode), and the second filter 60 may comprise a notch filter for extracting the low and high frequency components from the second position signal 52. In one embodiment, a number of disk drives may be evaluated to determine the dominant vibration mode (or modes) for a family of disk drives, and the first and second filters 56 and 60 may be designed accordingly.

We claim:

1. A disk drive comprising:
    (a) a disk having a plurality of servo sectors comprising servo information, the servo sectors defining a plurality of servo tracks;
    (b) an actuator arm;
    (c) a head attached to a distal end of the actuator arm;
    (d) a voice coil motor for rotating the actuator arm about a pivot;
    (e) an optical sensor that generates a first position signal representing a position of the actuator arm with respect to the disk, wherein the first position signal is substantially unaffected by a vibration mode of the actuator arm; and (f) control circuitry that: processes the servo information to generate a second position signal representing a position of the head with respect to the disk, wherein the second position signal comprises a significant component due to the vibration mode of the actuator arm; substantially rejects the significant component due to the vibration mode of the actuator arm in response to the first and second position signals; and generates a control signal applied to the voice coil motor in response to the first and second position signals.

2. The disk drive as recited in claim 1, wherein the servo information comprises servo bursts.

3. The disk drive as recited in claim 1, wherein the optical sensor comprises:
(a) a light source;
(b) a plurality of light sensitive sensors positioned to receive light from the light source; and
(c) a substantially opaque element positioned between the light source and the light sensitive sensors configured to control an amount of light at least one of the plurality of light sensitive sensors detects relative to the position of the actuator arm.

4. The disk drive as recited in claim 3, wherein the opaque element is coupled to a side of the actuator arm proximate the pivot.

5. The disk drive as recited in claim 3, wherein:
(a) the plurality of light sensitive sensors comprise a first sensor and a second sensor; and
(b) the optical sensor further comprises a differential amplifier operable to compute a difference between a first amount of light detected by the first sensor and a second amount of light detected by the second sensor, wherein the difference represents the position of the actuator arm.

6. The disk drive as recited in claim 3, wherein:
(a) the plurality of light sensitive sensors comprise a first sensor and a second sensor;
(b) the optical sensor further comprises a differential amplifier operable to compute a sum of a first amount of light detected by the first sensor and a second amount of light detected by the second sensor; and
(c) an intensity of the light emitted by the light source is controlled in response to the sum.

7. The disk drive as recited in claim 1, wherein the control signal applied to the voice coil motor is generated in response to a difference between the first and second position signals.

8. The disk drive as recited in claim 1, wherein the control circuitry comprises a servo compensator for generating the control signal in response to the first and second position signals.

9. The disk drive as recited in claim 8, wherein the servo compensator comprises:
(a) a first filter for filtering the first position signal to generate a first filtered signal;
(b) a second filter for filtering the second position signal to generate a second filtered signal; and
(c) an adder for combining the first and second filtered signals.

10. A method of operating a disk drive, the disk drive comprising a disk having a plurality of servo sectors comprising servo information, the servo sectors defining a plurality of servo tracks, an actuator arm, a head attached to a distal end of the actuator arm, a voice coil motor for rotating the actuator arm about a pivot, and an optical sensor, the method comprising the steps of:
generating a first position signal at the optical sensor representing a position of the actuator arm with respect to the disk, wherein the first position signal is substantially unaffected by a vibration mode of the actuator arm;
processing the servo information to generate a second position signal representing a position of the head with respect to the disk, wherein the second position signal comprises a significant component due to the vibration mode of the actuator arm;
substantially rejecting the significant component due to the vibration mode of the actuator arm in response to the first and second position signals; and
generating a control signal applied to the voice coil motor in response to the first and second position signals.

11. The method as recited in claim 10, wherein the servo information comprises servo bursts.

12. The method as recited in claim 10, wherein the optical sensor comprises:
a light source;
a plurality of light sensitive sensors positioned to receive light from the light source; and
a substantially opaque element positioned between the light source and the light sensitive sensors configured to control an amount of light at least one of the plurality of light sensitive sensors detects relative to the position of the actuator arm.

13. The method as recited in claim 12, wherein the opaque element is coupled to a side of the actuator arm proximate the pivot.

14. The method as recited in claim 12, wherein:
the plurality of light sensitive sensors comprise a first sensor and a second sensor; and
the method further comprises the step of computing a difference between a first amount of light detected by the first sensor and a second amount of light detected by the second sensor, wherein the difference represents the position of the actuator arm.

15. The method as recited in claim 12, wherein:
the plurality of light sensitive sensors comprise a first sensor and a second sensor,
the method further comprises the steps of:
computing a sum of a first amount of light detected by the first sensor and a second amount of light detected by the second sensor; and
controlling an intensity of the light emitted by the light source in response to the sum.

16. The method as recited in claim 10, wherein the step of generating the control signal further comprises the step of generating the control signal in response to a difference between the first and second position signals.

17. The method as recited in claim 10, wherein the step of generating the control signal comprises the steps of:
filtering the first position signal to generate a first filtered signal;
filtering the second position signal to generate a second filtered signal; and
combining the first and second filtered signals.

18. A disk drive comprising:
(a) a disk having a plurality of servo sectors comprising servo information, the servo sectors defining a plurality of servo tracks;
(b) an actuator arm;
(c) a head attached to a distal end of the actuator arm;

11

(d) a voice coil motor for rotating the actuator arm about a pivot;
(e) an optical sensor that generates a first position signal representing a position of the actuator arm with respect to the disk, wherein the first position signal is substantially unaffected by a vibration mode of the actuator arm and wherein the optical sensor comprises:
   a light source;
   a plurality of light sensitive sensors positioned to receive light from the light source; and
   a substantially opaque element positioned between the light source and the light sensitive sensors configured to control an amount of light at least one of the plurality of light sensitive sensors detects relative to the position of the actuator arm;
   wherein:
      the plurality of light sensitive sensors comprise a first sensor and a second sensor;
      the optical sensor further comprises a differential amplifier operable to compute a sum of a first amount of light detected by the first sensor and a second amount of light detected by the second sensor; and
      an intensity of the light emitted by the light source is controlled in response to the sum; and
(f) control circuitry that: processes the servo information to generate a second position signal representing a position of the head with respect to the disk, wherein the second position signal comprises a significant component due to the vibration mode of the actuator arm; and
   generates a control signal applied to the voice coil motor in response to the first and second position signals.

19. A disk drive comprising:
(a) a disk having a plurality of servo sectors comprising servo information, the servo sectors defining a plurality of servo tracks;
(b) an actuator arm;
(c) a head attached to a distal end of the actuator arm;
(d) a voice coil motor for rotating the actuator arm about a pivot;
(e) an optical sensor that generates a first position signal representing a position of the actuator arm with respect to the disk, wherein the first position signal is substantially unaffected by a vibration mode of the actuator arm; and
(f) control circuitry that: processes the servo information to generate a second position signal representing a position of the head with respect to the disk, wherein the second position signal comprises a significant component due to the vibration mode of the actuator arm; and
   generates a control signal applied to the voice coil motor in response to the first and second position signals,
   wherein:
      the control circuitry comprises a servo compensator for generating the control signal in response to the first and second position signals, the servo compensator comprising:
         a first filter for filtering the first position signal to generate a first filtered signal;
         a second filter for filtering the second position signal to generate a second filtered signal; and
         an adder for combining the first and second filtered signals.

12

20. A method of operating a disk drive, the disk drive comprising a disk having a plurality of servo sectors comprising servo information, the servo sectors defining a plurality of servo tracks, an actuator arm, a head attached to a distal end of the actuator arm, a voice coil motor for rotating the actuator arm about a pivot, and an optical sensor, the method comprising the steps of:
   generating a first position signal at the optical sensor representing a position of the actuator arm with respect to the disk, wherein the first position signal is substantially unaffected by a vibration mode of the actuator arm;
   processing the servo information to generate a second position signal representing a position of the head with respect to the disk, wherein the second position signal comprises a significant component due to the vibration mode of the actuator arm; and
   generating a control signal applied to the voice coil motor in response to the first and second position signals, wherein the step of generating the control signal comprises the steps of:
      filtering the first position signal to generate a first filtered signal;
      filtering the second position signal to generate a second filtered signal; and
      combining the first and second filtered signals.

21. A disk drive comprising:
(a) a disk having a plurality of servo sectors comprising servo information, the servo sectors defining a plurality of servo tracks;
(b) an actuator arm comprising a base end and a distal end;
(c) a head attached to the distal end of the actuator arm;
(d) a voice coil motor for rotating the actuator arm about a pivot in a pivot plane;
(e) an optical sensor that generates a first position signal representing a position of the actuator arm with respect to the disk, wherein the first position signal is substantially unaffected by a vibration mode of the actuator arm that causes the base end of the actuator arm to bend toward the distal end of the actuator arm about the pivot in-plane with the pivot plane; and
(f) control circuitry that: processes the servo information to generate a second position signal representing a position of the head with respect to the disk, wherein the second position signal comprises a significant component due to the vibration mode of the actuator arm; and
   generates a control signal applied to the voice coil motor in response to the first and second position signals.

22. A method of operating a disk drive, the disk drive comprising a disk having a plurality of servo sectors comprising servo information, the servo sectors defining a plurality of servo tracks, an actuator arm comprising a base end and a distal end, a head attached to the distal end of the actuator arm, a voice coil motor for rotating the actuator arm about a pivot in a pivot plane, and an optical sensor, the method comprising the steps of:
   generating a first position signal at the optical sensor representing a position of the actuator arm with respect to the disk, wherein the first position signal is substantially unaffected by a vibration mode of the actuator arm that causes the base end of the actuator arm to bend toward the distal end of the actuator arm about the pivot in-plane with the pivot plane;

processing the servo information to generate a second position signal representing a position of the head with respect to the disk, wherein the second position signal comprises a significant component due to the vibration mode of the actuator arm; and generating a control signal applied to the voice coil motor in response to the first and second position signals.

* * * * *